US008968931B2

(12) United States Patent
Balaya et al.

(10) Patent No.: US 8,968,931 B2
(45) Date of Patent: Mar. 3, 2015

(54) CRYSTALLINE MESOPOROUS TITANIUM DIOXIDE AND THE USE THEREOF IN ELECTROCHEMICAL DEVICES

(75) Inventors: Palani Balaya, Singapore (SG);
Ananthanarayanan Krishnamoorthy, Singapore (SG); Saravanan Kuppan, Singapore (SG)

(73) Assignee: National University of Singapore, Singapore (SG)

( * ) Notice: Subject to any disclaimer, the term of this patent is extended or adjusted under 35 U.S.C. 154(b) by 72 days.

(21) Appl. No.: 13/508,529

(22) PCT Filed: Nov. 8, 2010

(86) PCT No.: PCT/SG2010/000426
§ 371 (c)(1),
(2), (4) Date: May 7, 2012

(87) PCT Pub. No.: WO2011/056150
PCT Pub. Date: May 12, 2011

(65) Prior Publication Data
US 2012/0225355 A1 Sep. 6, 2012

(51) Int. Cl.
| H01M 4/50 | (2010.01) |
| B01J 21/06 | (2006.01) |
| C01G 23/08 | (2006.01) |
| H01M 4/02 | (2006.01) |
| B01J 35/00 | (2006.01) |

(Continued)

(52) U.S. Cl.
CPC .......... *B01J 21/063* (2013.01); *B01J 35/0013* (2013.01); *B01J 35/0026* (2013.01); *B01J 35/004* (2013.01); *B01J 35/023* (2013.01); *B01J 35/1019* (2013.01); *B01J 35/1061* (2013.01); *B01J 37/036* (2013.01); *H01G 9/2031* (2013.01); *H01M 4/133* (2013.01); *H01M 4/1393* (2013.01); *H01M 4/485* (2013.01); *H01M 4/5825* (2013.01); *H01M 4/624* (2013.01); *H01M 10/0525* (2013.01); *C01G 23/053* (2013.01); *H01M 2004/021* (2013.01); *Y02E 10/542* (2013.01); *Y02E 60/122* (2013.01); *C01P 2002/60* (2013.01); *C01P 2002/72* (2013.01); *C01P 2002/78* (2013.01); *C01P 2004/03* (2013.01); *C01P 2004/04* (2013.01); *C01P 2004/62* (2013.01); *C01P 2006/11* (2013.01); *C01P 2006/12* (2013.01); *C01P 2006/16* (2013.01); *C01P 2006/40* (2013.01)
USPC .......... 429/224; 428/219; 429/209; 502/350; 423/610

(58) Field of Classification Search
None
See application file for complete search history.

(56) References Cited

U.S. PATENT DOCUMENTS 7,087,348 B2 * 8/2006 Holman et al. ............... 429/209
2004/0161380 A1 * 8/2004 Zimehl et al. ................. 423/610

OTHER PUBLICATIONS

Chen et al. Titanium Dioxide Nanomaterials: Synthesis, Properties, Modifications, and Applications. Chem Rev 2007, 107, p. 2891-2959.*
Kavan, Ladislay. Nanocrystalline TiO2 for Solar Cells and Lithium Batteries. Advances in Science and Technology vol. 51, Oct. 1, 2006. (Abstract).*

(Continued)

*Primary Examiner* — Patrick Ryan
*Assistant Examiner* — Christopher Domone
(74) *Attorney, Agent, or Firm* — Squire Patton Boggs (US) LLP (57) ABSTRACT

The present invention relates to the preparation of a mesoporous substantially pure anatase titanium oxide (meso-TiO$_2$) and its use in electrochemical devices, in particular lithium-ion batteries.

12 Claims, 6 Drawing Sheets

(51) Int. Cl.
*B01J 35/02* (2006.01)
*B01J 35/10* (2006.01)
*B01J 37/03* (2006.01)
*H01G 9/20* (2006.01)
*H01M 4/133* (2010.01)
*H01M 4/1393* (2010.01)
*H01M 4/485* (2010.01)
*H01M 4/58* (2010.01)
*H01M 4/62* (2006.01)
*H01M 10/0525* (2010.01)
*C01G 23/053* (2006.01)

(56) References Cited

OTHER PUBLICATIONS http://www.who.int/medicines/publications/pharmacopoeia/Bulk-tapped-densityQAS11_450FINAL_MODIFIEDMarch2012.pdf. World Health Organization. Document QAS/11.450 Final. Mar. 2012.*

Hong et al. (Synthesis of spherical silica aerogel powder by emulsion polymerization technique). Journal of Ceramic Processing Research. vol. 13, Special. 1. p. s145-s148 (2012).*

* cited by examiner

CRYSTALLINE MESOPOROUS TITANIUM DIOXIDE AND THE USE THEREOF IN ELECTROCHEMICAL DEVICES

FIELD

This invention relates generally to the preparation of mesoporous essentially 100% anatase titanium dioxide (referred to herein as meso-$TiO_2$) and its use in electrochemical devices such as, in particular, lithium ion batteries.

BACKGROUND

Nanostructured materials have shown promise as electrodes because of their high storage capacity and high rate performance in terms of gravimetric energy density. Unfortunately, these positive effects are countered by a generally low packing density, which results in poor volumetric storage capacity. On the other hand, mesoporous electrode materials have been shown to exhibit high packing density but that positive aspect is offset by their inherent low electrical conductivity. That is, mesoporous materials for electrochemical use are usually synthesized as micrometer-size particles composed of nano-scale grains and having nanopores throughout in the range of 2-10 nm. This results in ready access for lithium ions to the electrode surface from electrolytes and facile $Li^+$ transport within the grains. However the electrons within the mesoporous particles need to be transported across a few microns to the nearest conductive carbon additive or current collector. Thus, in mesoporous materials a short transport length for Li-ions accompanied by a long transport length for electrons is observed, which is a limiting factor for high storage performance. To ameliorate this problem, electronically conductive carbon or $RuO_2$ (a metallic oxide that allows both $Li^+$ or $e^-$ to migrate) can be coated on the interior or exterior surfaces of the mesoporous material, which can result in excellent storage performance at high rates. For example, Guo, et al., Chem. Commun., 2005, 2454, reported a mesoporous $TiO_2$ with a surface area of about 130 $m^2g^{-1}$ coated with $RuO_2$ that exhibits storage capacity of 190 and 125 mAh/g at 1 and 10 C rate. Though the preceding technique is widely employed to achieve high storage performance, there remains a need for electrode materials with superior storage capacity at high C-rates without complex surface coatings of conductive materials so as to result in less complicated, more economical lithium-ion batteries. The current invention provides such an electrode material.

In lithium-ion batteries, chemical energy can be reversibly stored through recharging by homogeneous intercalation and deintercalation reaction without significant structural changes. For example, lithium ion batteries used in laptop, mobile phones etc., comprised of $LiCoO_2$ as the cathode and graphite as the anode make use of the rocking chair concept of lithium insertion. During the charge operation, $Li^+$ ions from $LiCoO_2$ transfers to the graphite anode through the non-aqueous electrolyte to form $LiC_6$ while electrons flow in the reverse direction through the external circuit. During the discharge operation (when delivering power to an appliance) the reverse occurs. Thus the $Li^+$ shuttle between the two electrodes during charge-discharge cycling is facilitated by the layer-type crystal structure of the electrodes. The high reversibility of the electrochemical process is caused by the soft insertion/extraction of $Li^+$ in these host lattices.

Lithium ion battery provide many advantages such as high open circuit voltage (~4 V), excellent cyclic performance (more than 3000 charge-discharge cycles) and high coulombic efficiency (95%), but they generally exhibit limited lithium storage capacity. Only 0.5 Li could be removed from $LiCoO_2$ resulting in $Li_{0.5}CoO_2$ (137 mAh/g using a half cell of $LiCoO_2$ versus Li metal) and 1 $Li^+$ could be stored in graphite in the form of $LiC_6$ (370 mAh/g using a half cell of graphite versus Li metal). Since most of today's high performance portable microelectronic devices demand high energy density, there is a great interest in increasing the storage capacity of Li in both cathode and anode materials.

SUMMARY OF THE INVENTION

Thus, in one aspect the instant invention is related to a mesoporous $TiO_2$, comprising a substantially pure anatase crystal lattice structure, wherein the lattice structure comprises grains of a size of about 10 nanometers (nm) to about 50 nm, wherein the grains form particles of a size of at least about 0.8 micrometers (µm); pores of a size of about 5 nm to about 25 nm; a tap density of at least 0.6 g/cm$^3$; and a surface area of at least 135 m$^2$/g.

In an aspect of this invention, the grain size is about 15 to about 20 nm.

In an aspect of this invention, the particle size is about 1 µm to about 2 µm.

In an aspect of this invention, the pore size is about 5 nm to about 10 nm.

In an aspect of this invention, the tap density is about 0.6 g/cm$^3$ to about 0.9 g/cm$^3$.

In an aspect of this invention, the surface area is about 135 to about 180 m$^2$/g.

An aspect of this invention is a device, selected from the group consisting of a electrode, an anode, a battery, a semiconductor, a dye-sensitized solar cell (DSSC) and a photocatalyst, comprising the mesoporous $TiO_2$ of this invention.

An aspect of this invention is an anode, comprising the mesoporous $TiO_2$ of this invention.

An aspect of this invention is an electrochemical cell, comprising the above anode of this invention.

In an aspect of this invention, the electrochemical cell of this invention further comprises a cathode.

In an aspect of this invention the cathode comprises a compound selected from $LiMnPO_4$ and $Li_2MnSiO_4$.

An aspect of this invention comprises a lithium-ion battery, comprising an anode of this invention wherein the anode comprises the mesoporous $TiO_2$ of this invention.

An aspect of this invention comprises a lithium-ion battery that comprises the above electrochemical cell.

An aspect of this invention is a method comprising dissolving an 8 carbon to 18 carbon quaternary ammonium surfactant in about 150 mL of 4:1 (v:v) water/absolute ethanol; adding drop wise a stoichiometric amount of a titanium alkoxide; stirring the reaction mixture for approximately 18 to approximately 24 hours, during which time a precipitate forms; collecting the precipitate; washing the precipitate several times with 95% ethanol; heating the precipitate at about 75° C. to about 125° C. for about 0.5 to about 2 hours; and calcinating the precipitate at about 250° C. to about 550° C. for about 4 to about 7 hours.

In an aspect of this invention, in the above method, the 8 carbon to 18 carbon quaternary ammonium surfactant is selected from the group consisting of octyltrimethylammonium bromide (OTAB-8), decyltrimethylammonium bromide (DTAB-C10), dodecyltrimethylammonium bromide (DOTAB-12), myristyltrimethylammonium bromide (MYTAB-14), cetyltrimethylammonium bromide (CTAB-C-16) and octadecyltrimethylammonium bromide (ODTAB-C18).

In an aspect of this invention, in the above method, the titanium alkoxide is selected from the group consisting of titanium n-propoxide, titanium isopropoxide and titanium butoxide.

In an aspect of this invention, in the above method, heating is done at approximately 100° C. for approximately 1 h.

In an aspect of this invention, in the above method, calcinating is done at approximately 450° C. for approximately 6 h.

DETAILED DESCRIPTION

Brief Description of the Figures

The figures herein are provided for the sole purpose of aiding in the understanding of this invention; they are in no manner intended nor should they be construed as limiting the scope of this invention in any manner whatsoever.

BRIEF DESCRIPTION OF THE TABLES

Table 1 provides a comparison of the electrochemical performance of various forms of $TiO_2$ compared to the meso-$TiO_2$ of the instant invention.

Discussion

It is understood that with regard to this description and the appended claims, any reference to any aspect of this invention made in the singular includes the plural and vice versa unless it is expressly stated or unambiguously clear from the context that such is not intended.

As used herein, any term of approximation such as, without limitation, near, about, approximately, substantially, essentially and the like mean that the word or phrase modified by the term of approximation need not be exactly that which is written but may vary from that written description to some extent. The extent to which the description may vary will depend on how great a change can be instituted and have one of ordinary skill in the art recognize the modified version as still having the properties, characteristics and capabilities of the modified word or phrase. In general, but with the preceding discussion in mind, a numerical value herein that is modified by a word of approximation may vary from the stated value by ±10%, unless expressly stated otherwise.

Unlike nanopowders, nanowires, nanorods and nanotubes, micron-sized mesoporous materials exhibit high packing density. In view of this, mesoporous electrode materials have been investigated extensively for lithium batteries. Though mesoporous electrodes exhibit easy $Li^+$ transport from electrolytes, electron conduction over micrometer sized particles limits the rate performances of lithium-ion batteries using current mesoporous materials. Electronic wiring using thin layer (2-5 nm) conductive carbon or $RuO_2$ has been employed to overcome this limitation and achieve excellent storage behavior.

The instant invention provides a simple approach for the synthesis of meso-$TiO_2$ with high packing density using a soft template procedure. The resulting meso-$TiO_2$ exhibits superior storage performances at high storage performance rates without any surface decoration with conductive materials such as $RuO_2$, which is currently used in the manufacture of lithium-ion batteries. Though the soft-template method is generally known in the area of materials chemistry, the technique has been optimized herein to afford substantially pure mesoporous anatase having specific physical properties. Cationic surfactants with different chain lengths were used as the soft template to form meso-$TiO_2$ with different surface areas. Meso-$TiO_2$ with surface areas as high as 160 $m^2/g$ with pores of about 5 nm can readily be produced. Of course, surface areas as high as possible are desirable but for the purposes of this invention a surface area of at least 135 $m^2/g$ is presently preferred with no upper limit depending, of course, on structural integrity of the resultant material. Higher surface area meso-$TiO_2$ prepared using essentially the method herein is within the scope of this invention. Presently preferred is a surface area range of about 135 $m^2/g$ to about 180 $m^2/g$. In one embodiment, meso-$TiO_2$ formed using a C16 quaternary ammonium compound as the template (C16-$TiO_2$) had a surface area of approximately 135 $m^2/g$ with remarkably high reversible capacity of 288, 220, 138 and 134 mAh/g at 0.2, 1, 5 and 10 C. Surprisingly, C16-$TiO_2$ exhibits high storage performance at low rates (0.2 C) without added conductive carbon. This is the first time that it has been shown that high lithium storage could be achieved in a $TiO_2$ electrode without additive carbon. Storage performances as well as the packing density of the meso-$TiO_2$ of this invention was compared with a commercially available $TiO_2$ nanopowder (P25, Degussa), the results of which are discussed below.

The grains of meso-$TiO_2$ are well-connected at interfaces resulting in a high tap density, which favors enhanced electron conduction. This high tap density augers well for application in batteries, semiconductors, dye-sensitized solar cell (DSSC), photo catalyst, sensors and other devices dependent on electrochemical potential differences. As with surface areas, the greater the tap density the better. It is presently preferred that a tap density of at least 0.6 $g/cm^3$ be achieved but any higher tap density obtained using essentially the method of this invention is clearly within the scope hereof. It is presently preferred that a tap density of about 0.6 to about 0.9 $g/cm^3$ be obtained with a tap density of about 0.7 $gm/cm^3$ being a presently specifically preferred embodiment of this invention.

When applied to lithium-ion batteries, with the preceding tap densities enhanced electron conduction could be achieved at low rates (0.2 C) even without conductive carbon additive (15%). The packing density of the meso-$TiO_2$ of this invention is found to be about 6.6 times higher than the commercial $TiO_2$ nanopowder resulting in a high volumetric storage capacity. This is a key requirement for the fabrication of electrode materials on small area current collectors, wherein the reduction of dead weight of the current collector is crucial.

As used herein, the tap density of a powdery substance refers to the apparent density of a volume of the powder obtained when a receptacle containing the powder is tapped or vibrated. That is, a predetermined amount of the powder, in this case 1 g each of commercial $TiO_2$ nanopowder and the meso-$TiO_2$ powder of this invention were placed in a graduated cylinder and the cylinder was secured prior to tapping. The number of taps was the same for both samples. When tapping was completed, the final volume occupied by the powders were measured using water as a reference. The packing density of meso-$TiO_2$ of this invention was found to be 0.714 $gcm^3$ whereas the commercial $TiO_2$ nanopowder exhibited a 0.108 $gcm^{-3}$ packing density, a difference of 6.6 times.

Without being limited to any particular theory, it is thought that the superior storage performance without conductive additives is due to enhanced electron conductivity at reduced grain size (15-20 nm) even though the particle size is in the range of 1 to 2 μm. Intimate contact between grains at the interfaces favors facile electron conduction which is a consequence of enhanced interfacial electrical conduction. This is the first example of a lithium-ion battery electrode, where such nano-scale effects appear to cause enhanced electrical conduction, which in turn influences the lithium storage performance of these electrode materials.

C8-$TiO_2$, C12-$TiO_2$ and C16-$TiO_2$ were synthesized using the soft-template method with titanium isopropoxide as a titanium source. Various cationic surfactants such as octadecyltrimethylammonium bromide (OTAB) (C8), dodecyltrimethylammonium bromide (DOTAB) (C12) and cetyltrimethylammonium bromide (CTAB) (C16) were used as templates. DeGussa P25 commercial titania nanopowder having a grain size of 25 nm was used for comparison purposes. A representative preparation is as follows. CTAB (3.64 gm) was dissolved in a mixture of de-ionized water and absolute ethanol in a volume ratio of 4:1 (120 mL water:30 mL Ethanol) in a round-bottom flask. To this solution, 14.31 mL of TiOPr was added drop-wise with continuous vigorous stirring. The resulting gel was then continuously stirred for 24 h. The obtained precipitate was then filtered, washed several times with ethanol and then heated at 100° C. for 1 h. Calcination was done in static air at 450° C. for 6 h to remove the organic template and to: increase the cross-linking of the inorganic framework.

Figure 1:
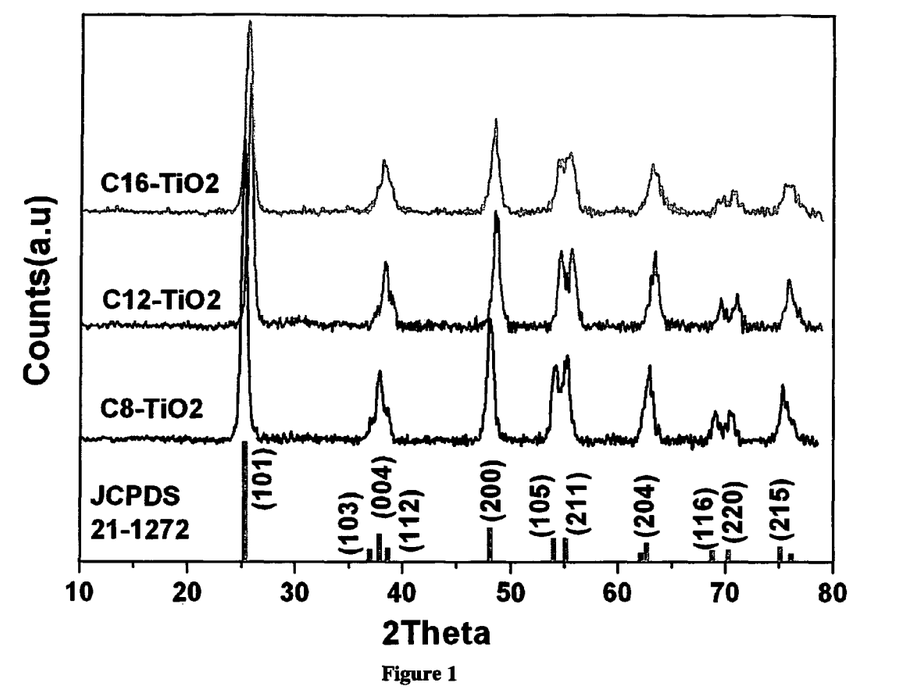
FIG. 1 shows a powder x-ray diffraction (PXRD) pattern of mesoporous anatase $TiO_2$ prepared using C8 (C8-$TiO_2$), C12 (C12-$TiO_2$) and C16 (C16-$TiO_2$) surfactants.

PXRD patterns clearly reveal that the method herein results in the formation of meso-$TiO_2$ (JCPDS 21-1272) without any intermixed rutile and/or brookite. The calculated cell parameters for this anatase phase are in good agreement with earlier reports.

Figure 2:
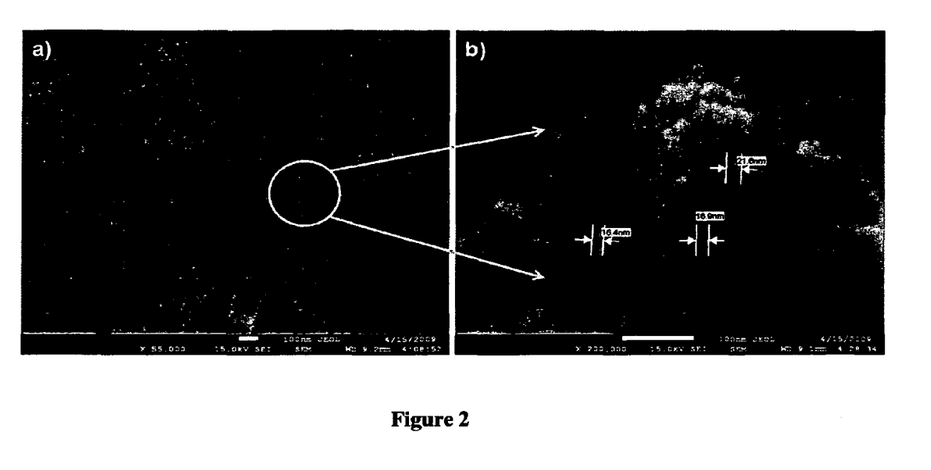
FIG. 2 shows field emission scanning electron microscopy (FESEM) images of C16-$TiO_2$.

A low magnification FESEM image (FIG. 2a) shows an irregular sphere like morphology for $TiO_2$ particles of various sizes in the range 300-800 nm in one experiment although particles of the presently preferred size, 1 to 2 μm have been observed in other experiments. Under high magnification, the spheres were observed to be comprised of 15 to 20 nm primary grains of $TiO_2$ that are loosely bound together (FIG. 2b) although a broader range of grain size may be obtainable, e.g., in the range of about 5 to about 25 nm, which would also be expected to result in useful meso-$TiO_2$.

Figure 3:
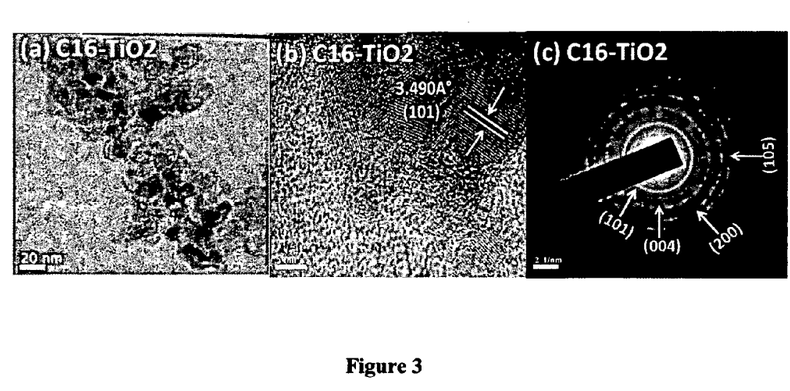
FIG. 3 shows transmission electron microscopy (TEM), high resolution TEM (HRTEM) and scanning area electron diffraction (SAED) images of C16-$TiO_2$ (a-c).

TEM images reveal that the meso-$TiO_2$ crystals have randomly oriented uniform grains with an average size of about 15 to 20 nm (FIG. 3a). An HRTEM image of the meso-$TiO_2$ of this invention provides an added insight into the microstructures of these materials (FIG. 3b). The clear lattice fringes observed indicates that the meso-$TiO_2$ of this invention is highly crystalline. The observed width of 3.495±5 Å between neighboring lattice fringes corresponds to the (101) plane of anatase $TiO_2$. FIG. 3c show the SAED pattern of the meso-$TiO_2$ sample, with diffraction rings (101), (004), (200) and (105) of randomly oriented anatase $TiO_2$, consistent with the PXRD pattern in FIG. 1.

Figure 4:
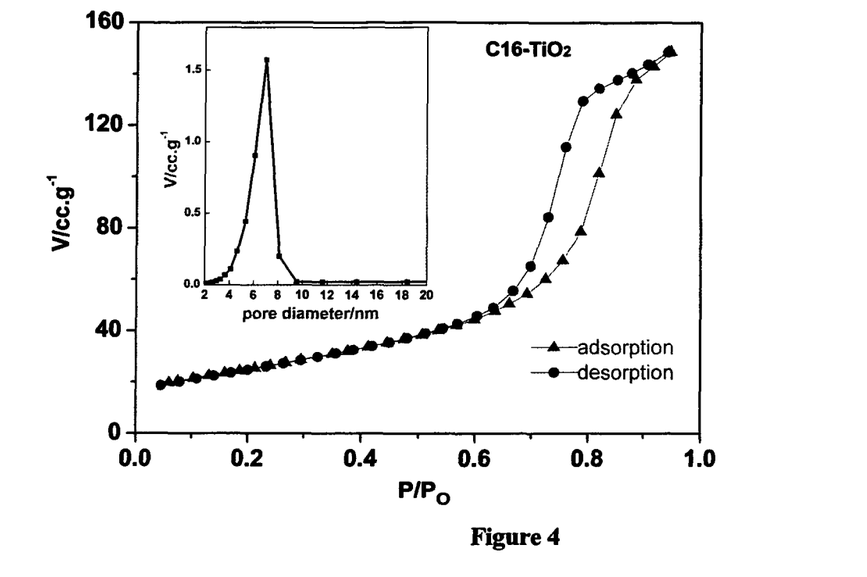
FIG. 4 shows an $N_2$ adsorption/desorption isotherm of C16-$TiO_2$.

All samples exhibit a distinct large hysteresis loop from 0.5 to 0.8 relative partial pressure (P/Po). This behavior is a typical characteristic of mesoporous materials, namely a type IV isotherm due to capillary condensation in the mesoporous channels and/or cages. A Barrett-Joiner-Halenda (BJH) analysis of the adsorption branch of the isotherm indicates that the calcined $TiO_2$ has a mesoporous structure with rather narrow pore-size distribution (mean pore size 5-7 nm, calculated based on a BJH model). The Brunauer-Emmett-Teller (BET) surface area of OTAB (C8), DOTAB (C12) and CTAB (C16), templated $TiO_2$ was found to be 90, 109 and 135 $m^2/g$. A relationship was observed between the surfactant and the surface area of the meso-$TiO_2$. As the surfactant chain length increases, the pore size and the surface area also increases. As a representative example, the isotherm of CTAB templated $TiO_2$ is given in FIG. 4.

Figure 5:
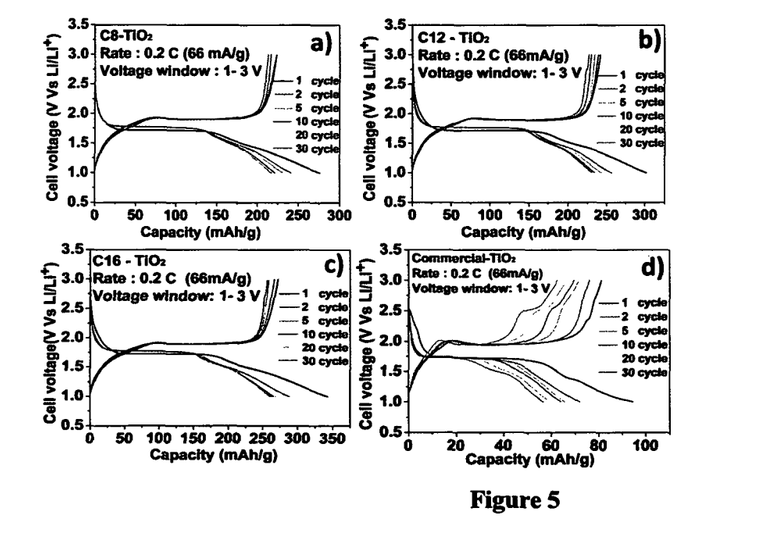
FIG. 5 shows charge-discharge voltage profiles of various embodiments of the mesoporous anatase $TiO_2$ of this invention compared to a commercial $TiO_2$ at a 0.2 C rate for representative cycles (1st, 2nd, 5th, 10th, 20th, 30th).

All the mesoporous anatase $TiO_2$ synthesized using various templates showed distinct potential plateaus at 1.73 and 1.90 V for the Li insertion (discharging) and the Li extraction (charging) processes. At 1.73 V, lithium insertion during the plateau was found to be 116 mAh/g for C16-$TiO_2$, 106 mAh/g for C12-$TiO_2$ and 94 mAh/g for C8-$TiO_2$. A large amount of Li was inserted during the sloped region from 1.73 to 1.0 V and the corresponding capacities in the sloped regions were found to be 184.5, 148 and 140 mAh/g for C16-$TiO_2$, C12-$TiO_2$ and C8-$TiO_2$. The total storage capacity for C16-$TiO_2$, C12-$TiO_2$ and C8-$TiO_2$ during the first discharge process was found to be 343 (x=1.02), 301 (x=0.90) and 276 mAh/g (x=0.82). The lithium storage capacity of DeGussa $TiO_2$ was found to be 94.5 mAh/g corresponding to 0.28 mole of $Li^+$. Thus, the meso-$TiO_2$ of the present invention exhibits far better storage performance than commercial $TiO_2$ nanopowder. The subsequent charging (Li+ extraction) shows a monotonous increase in capacity up to 1.90 V and this region is complementary to the Li insertion at the sloped region (1.73-1.00 V). Extraction capacity up to 1.90 V was found to be 87, 73 and 70 mAh/g for C16-$TiO_2$, C12-$TiO_2$ and C8-$TiO_2$. At 1.90 V continuous extraction of Li occurred during the plateau, followed by a curved solid solution regime up to 3.00 V. The total extraction capacity was found to be 272, 242 and 224 mAh/g for meso C16-$TiO_2$, C12-$TiO_2$ and C8-$TiO_2$.

Figure 6:
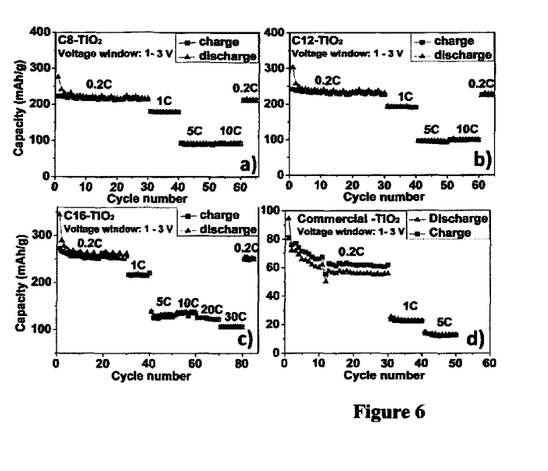
FIG. 6 shows cyclic performance of various embodiments of the meso-$TiO_2$ of this invention compared to a commercial nanoporous $TiO_2$ at various C rates (rate capability).
Figure 7:
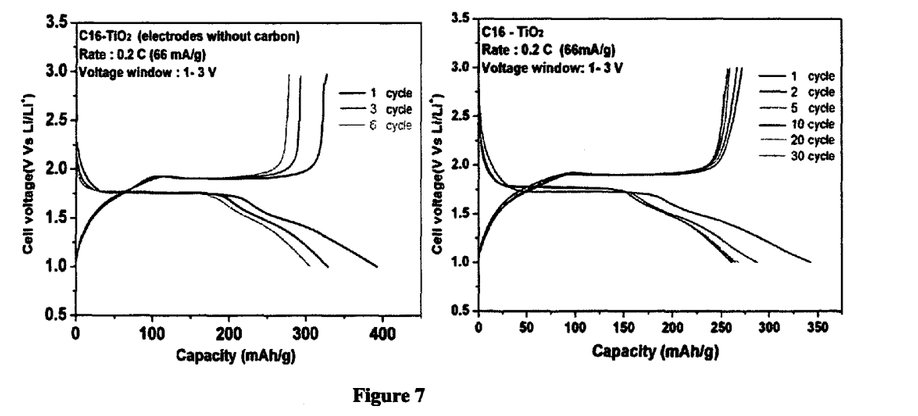
FIG. 7 shows cyclic performance of C16-$TiO_2$ electrodes without and with carbon. Excellent storage performance without additive conducting carbon is observed, providing clear evidence of high electronic conductivity with the meso-$TiO_2$ of this invention.
Figure 8:
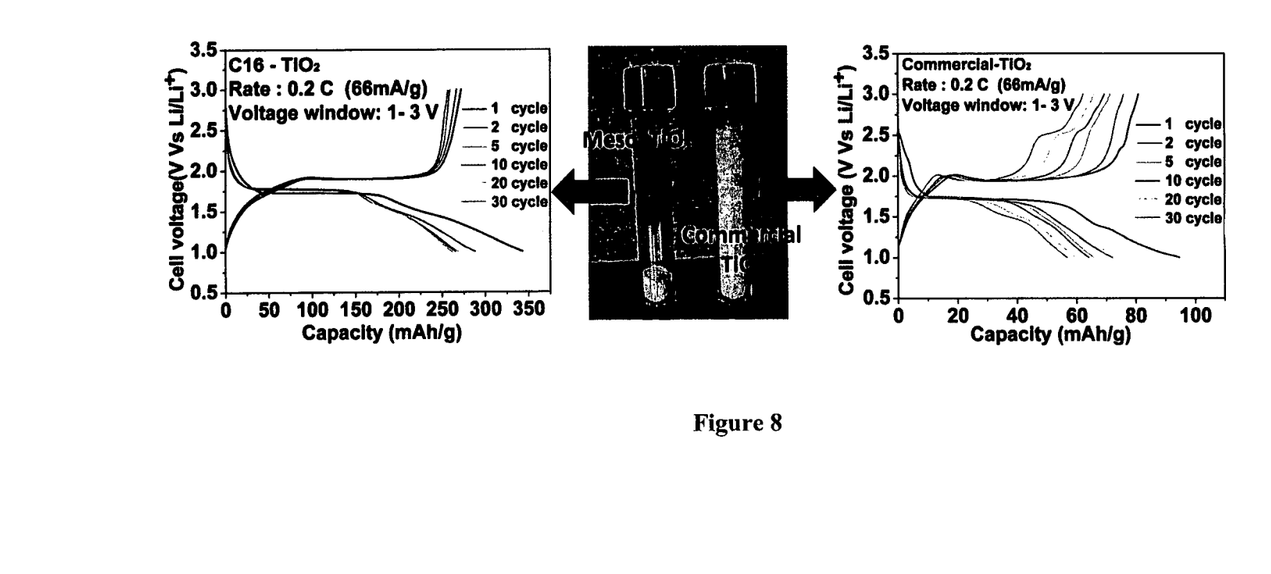
FIG. 8 shows a comparison of current versus voltage of the meso-$TiO_2$ of this invention and commercial nanopowder $TiO_2$ using 1.0 gram of each at a rate of 0.2 C.

High-rate performance (FIG. 6) is one of the significant electrochemical aspects of lithium-ion batteries for high power applications (HEV and EV). The insertion/extraction capacity of the meso-$TiO_2$ of the current invention was studied at different C rates and the results are shown in FIG. 6. Excellent specific storage capacity was achieved for discharge/charge rates tested up to 10 C. The reversible capacity was about 268, 220, 138, and 134 mAh/g at 0.2, 1, 5, and 10 C for C16-$TiO_2$. Table 1 compares the reversible capacities at different C-rates for C16-$TiO_2$, with those for C12-$TiO_2$, C8-$TiO_2$.

TABLE 1

Comparison of the performance of various mesoporous $TiO_2$

| C Rate (at 20th Cycle) | Maier Meso-$TiO_2$ | Maier Meso-$TiO_2$:$RuO_2$ | Maier Meso-Spheres (Cd Acetate Route) | $TiO_2$ Nanotubes | Kubiak Meso $TiO_2$ | Meso-$TiO_2$ of this invention | | |
|---|---|---|---|---|---|---|---|---|
| | | | | | | C8 | C12 | C16 |
| 0.2 C | 210 mAh/g | 230 mAh/g | 210 mAh/g | 218 mAh/g | 184 mAh/g At 6 C: 127 mAh/g At 30 C: 95 mAh/g | 232 mAh/g | 242 mAh/g | 268 mAh/g |
| 10 C | 90 mAh/g | 115 mAh/g | Not reported | Not reported max 5 C (168 mAh/g) | | 91 mAh/g | 96 mAh/g | 134 mAh/g |

In summary, mesoporous essentially pure anatase $TiO_2$ has been synthesized using a soft-template method and the resulting material has been shown to exhibit excellent storage performance with reversible capacities close to the theoretical value at low rates and a remarkable high rate performance up to 10 C. The high packing density of the novel meso-$TiO_2$ of this invention compared to commercially available $TiO_2$ nanopowder (6.6 times higher compared to that for 25 nm nanopowder) combined with enhanced gravimetric storage capacity should provide significantly high volumetric storage capacities.

Enhanced storage capability without a conductive surface layer (at high rate) or additive conducting carbon (at low rate) is thought to occur as the result of the high electronic conductivity of meso-$TiO_2$ due to a nano-scale size of the $TiO_2$ grains. Due to relatively high potential (1.7 V), unlike carbon (0.2 V), negligible reaction of the meso-$TiO_2$ of this invention with electrolyte (SEI formation) is observed.

The meso-$TiO_2$ of this invention can be used as an anode in lithium-ion battery. If this potential of 1.7V is combined with cathodes such as, without limitation, $LiMnPO_4$, which has a 4.1 V potential, a high energy density and power density for lithium-ion battery with 2.4V up to 10 C rate can be achieved. Such high energy density and high power density battery could be used in electric vehicle technology including plug-in hybrid electric vehicles.

Though meso-$TiO_2$ has high storage capacity at low as well as high rate (10 C), high volumetric storage capacity and less reaction with the electrolytes, it does have a high inherent potential, 1.7V. This high potential could be balanced by appropriate selection of cathode materials with high potential, for example, but not limited to, the above-indicated $LiMnPO_4$ (4.1V) and $Li_2MnSiO_4$.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed:

1. A mesoporous $TiO_2$, comprising:
   a substantially pure anatase crystal lattice structure, wherein the lattice structure comprises:
   grains of a size of about 10 nanometers (nm) to about 50 nm, wherein:
   the grains form particles of a size of at least about 0.8 micrometers (μm);
   pores of a size of about 5 nm to about 25 nm;
   a tap density of about 0.6 g/cm$^3$ to about 0.9 g/cm$^3$; and
   a surface area of about 135 m$^2$/g to about 180 m$^2$/g.

2. The mesoporous $TiO_2$ of claim 1, wherein the grain size is about 15 to about 20 nm.

3. The mesoporous $TiO_2$ of claim 2, wherein the particle size is about 1 pm to about 2 pm.

4. The mesoporous $TiO_2$ of claim 3, wherein the pore size is about 5 nm to about 10 nm.

5. A device, selected from the group consisting of a electrode, an: anode, a battery, a semiconductor, a dye-sensitized solar cell (DSSC) and a photocatalyst, comprising the mesoporous $TO_2$ of claim 1.

6. An anode, comprising the mesoporous $TiO_2$ of claim 1.

7. An electrochemical cell, comprising the anode of claim 6.

8. The electrochemical cell of claim 7, further comprising a cathode.

9. The electrochemical cell of claim 8, wherein the cathode comprises a compound selected from $LiMnPO_4$ and Li2MnSiO$_4$.

10. A lithium-ion battery, comprising the anode of claim 6.

11. A lithium-ion battery, comprising the electrochemical cell of claim 8.

12. A lithium-ion battery, comprising the electrochemical cell of claim 9.

* * * * *